Aug. 18, 1931. A. A. GOERZ 1,819,287
METHOD OF ASSEMBLING STRUCTURAL STEEL
Filed Dec. 1, 1928
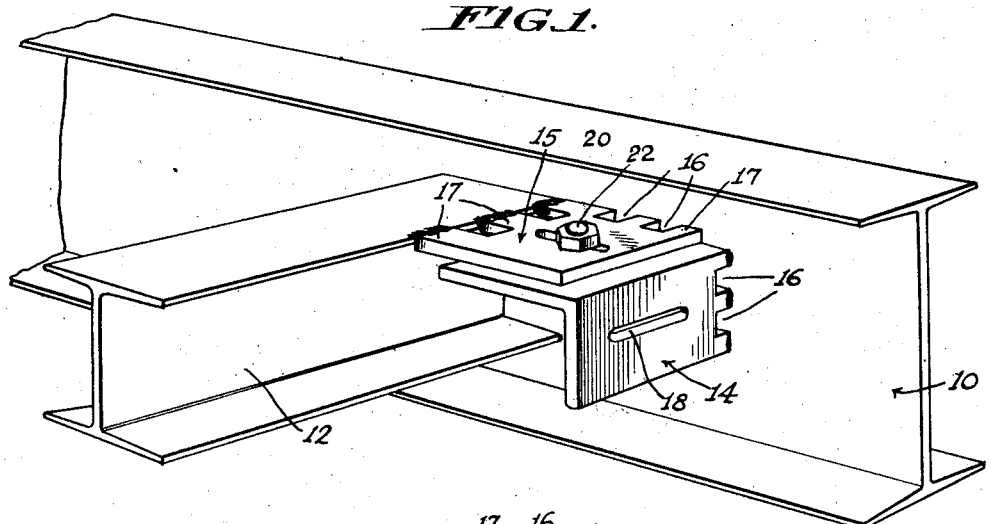
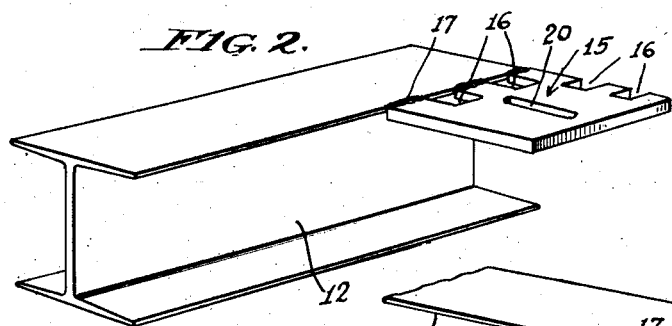
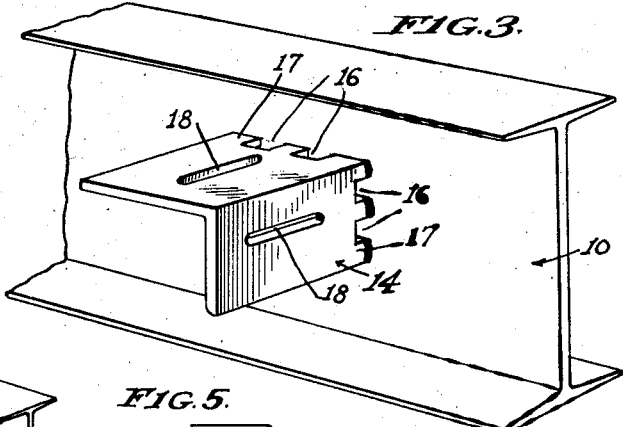
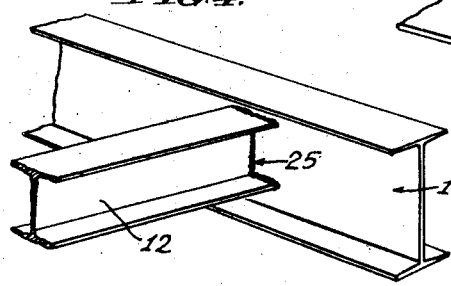
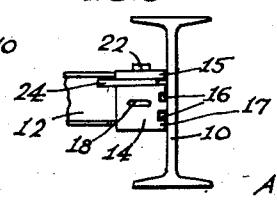
INVENTOR.
ARTHUR A. GOERZ.
ATTORNEY Patented Aug. 18, 1931

1,819,287

UNITED STATES PATENT OFFICE

ARTHUR A. GOERZ, OF ALHAMBRA, CALIFORNIA

METHOD OF ASSEMBLING STRUCTURAL STEEL

Application filed December 1, 1928. Serial No. 322,982.

This invention relates to the assembling of structural steel elements in the fabrication of buildings or other units, and applies especially to the method employing electric welding.

Heretofore, when fabricating steel structures by welding, much time has been required in the drafting room and shop, as well as on the job, to insure exact positioning of the parts to be welded. This has included the accurated locating of holes by the draftsman, laying out, drilling, punching, reaming, and incidental handling.

By the present invention all these objectionable features are avoided. The invention includes the provision of clips in the form of small plates or angle irons which are provided in their various walls with slots so disposed that when in operative position the slots of one clip may lie transversely with respect to the slot or slots of another clip. These clips are then tack-welded in approximate position to the beams, girders, trusses, plates, brackets or whatever other steel members are being assembled.

It is then a simple matter to move the end of one member up to another member to which it is to be welded so that some portions of the slots register, pass a bolt through the slots, slip in shims if necessary for exact positioning in one direction, make the exact adjustments in the other directions by slipping the bolt in the slots, and tighten the bolt. The end of the one member is then welded to the other, the bolt is removed, and the clips are salvaged by knocking them loose with a sledge, or removing the same in any suitable manner. As the positioning clips are so positioned on the beam or other members that are to be welded together the same will offer little or no interference during a welding operation of said members.

Thus, the invention may be said to comprise welding temporary clips to the beams or other parts being assembled, adjusting the clips upon one another, binding the clips in adjusted position by means of a removable fastener, and permanently welding together the parts being assembled. The invention resides also in the clips employed in performing the operation, and in such other features and improvements as may be herein disclosed.

In the accompanying drawings, wherein one embodiment of the invention is disclosed by way of illustration;

Fig. 1 shows two beams held in adjusted position by means of clips tack-welded thereto and in turn secured by a bolt, the beams being ready for final welding.

Fig. 2 is a perspective view of one beam with its clip attached.

Fig. 3 is a similar view of the other beam.

Fig. 4 represents the final welding, the clips having been removed.

Fig. 5 indicates how a shim may be slipped in for proper vertical adjustment.

In the drawings, a principal supporting beam 10 and a cross beam of girder 12 are shown in the various steps of assembly. To the web of the beam 10, a clip 14 in the form of an angle bar is tack-welded, and to the girder 12 a clip 15 in the form of a plate is similarly tack-welded, this clip however being conveniently secured to the upper flange. In order that positioning of the clips and tack-welding thereof may be faciliated, at least two edges of each clip is notched as indicated at 16, thus providing a plurality of short legs 17, the ends of each of which can be readily welded. The notching of a plurality of edges of each clip makes it impossible for an operator to weld the entire edge of the clip to the member to be welded. The angle clip 14 is provided on both walls with slots 18 and the clip 15 is provided with slot 20, the clips being so mounted that when the beams are brought to the desired positions, the slots in the contacting faces of the clips will lie transversely of one another for ready reception of a retaining bolt 22 and in order that lateral adjustments may be easily made. If required to make vertical adjustment shims 24 are placed as indicated in Fig. 5. Further by slotting and notching the legs of each angle clip, and two edges of the plate clip it will render it possible to utilize the clips and plates in either a right or left hand connection.

This accurate positioning having been accomplished, the bolt 22 is cinched up, and the welding of the web and flanges of the girder 12 to the web of beam 10 proceeds to produce the welded joint 25 best indicated in Fig. 4. The welding having been accomplished, the clips may be left if desired; or they may be salvaged by removing the bolts and knocking off the clips with a sharp blow of a sledge or the like, or by loosening with a torch.

Thus, it will be seen that any sort of steel structure may be built up or repaired by the use of temporary positioning means which permit accurate adjustment right on the job, and that this method eliminates the work of accurate drafting, the accurate drilling of holes, and other time consuming and expensive operations required heretofore. It also avoids the drilling and consequent weakening of the members being assembled. The clips can be of any shape required for any type of work, curved or otherwise, and it is obvious that even with approximate positioning of the clips an absolutely exact positioning of the beams or other parts can be accomplished before tightening of the bolt 24, the bolt serving to maintain this adjustment during the final operation of welding the joint 25. The convenience of the operation and the saving in time and costs, constitute a large item.

I claim:

1. A method for assembling steel building frame structures, comprising tack-welding positioning clips to each of two members that are to be permanently received to each other, adjustably connecting the two clips, adjusting the two members to form a joint, binding the connection, and finally permanently welding the joint.

2. A method for joining two steel building frame members, comprising a tack-welding positioning clip to each member that are to be permanently secured to each other, each clip having a slot, bringing the two members into engagement and with the slots lying transverse to each other, adjusting the members to desired position, binding the clips together by means passing through said slots to retain the adjustment, and finally welding the joint at the point of engagement between the two members.

3. A method of joining two steel building frame members, comprising tack-welding a clip to each member, bringing the members into engagement and with said clips in co-operative relation, adjusting the position of the members, binding said clips together to maintain the adjustment, permanently welding the joint between the two members, and then finally removing the clips.

In testimony whereof I affix my signature.

ARTHUR A. GOERZ.